United States Patent
Homa (10) Patent No.: US 7,493,009 B2
(45) Date of Patent: Feb. 17, 2009

(54) OPTICAL FIBER WITH TIN DOPED CORE-CLADDING INTERFACE

(75) Inventor: Daniel S. Homa, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/753,746

(22) Filed: May 25, 2007

(65) Prior Publication Data
US 2008/0292256 A1 Nov. 27, 2008

(51) Int. Cl.
G02B 6/00 (2006.01)
G02B 6/028 (2006.01)
G02B 6/036 (2006.01)
C03B 37/023 (2006.01)

(52) U.S. Cl. ............. 385/142; 385/124; 385/126; 385/141; 65/385

(58) Field of Classification Search ........... 385/126, 385/127, 128, 141, 142, 144
See application file for complete search history.

(56) References Cited

U.S. PATENT DOCUMENTS

| 5,862,273 | A | | 1/1999 | Pelletier |
| 6,009,222 | A | * | 12/1999 | Dong et al. ............ 385/127 |
| 6,160,944 | A | * | 12/2000 | Payne et al. ............ 385/129 |
| 6,321,007 | B1 | | 11/2001 | Sanders |
| 6,643,442 | B2 | | 11/2003 | Brambilla et al. |
| 2002/0146223 | A1 | * | 10/2002 | Sorin et al. ............ 385/123 |
| 2005/0117860 | A1 | * | 6/2005 | Vienne et al. ........... 385/115 |
| 2006/0140529 | A1 | | 6/2006 | Childers |
| 2006/0222306 | A1 | | 10/2006 | Homa et al. |

OTHER PUBLICATIONS

Brambilla et al. "High Photosensitivity in SnO2:SiO2 Optical Fibers," in Fiber and Integrated Optics, 20(6):553-564, 2001.
Brambilla and Rutt. "Fiber Bragg Gratings with Enhanced Thermal Stability," in Applied Physics Letters, vol. 80, No. 18, May 6, 2002.
Chiodini et al. "Photoinduced Processes in Sn-Doped Silica Fiber Preforms," in Applied Physics Letters, vol. 77, No. 23, Dec. 4, 2000.
Dong et al. "Strong Photosensitive Gratings in Tin-Doped Phosphosilicate Optical Fibers," in Optics Letters, vol. 20, No. 19, Oct. 1, 1995.
Brambilla et al. "Strong Fibre Bragg-Gratings Written in Highly Photosensitive Sn-Doped Fibres without H2-Loading Using KrF Excimer and UV Copper Vapour Lasers," in Proceedings of IOP meeting on "In-Fibre Gratings and Special Fibres," Photonex, 2001, Coventry.

(Continued)

Primary Examiner—Charlie Peng
(74) Attorney, Agent, or Firm—The H. T. Than Law Group (57) ABSTRACT

The present invention concerns an optical fiber 10 comprising a substantially pure silica glass core 12, a concentric tin-doped core/cladding interface region 14, and a concentric fluorine-doped depressed cladding layer 16. The tin-doped core/cladding interface region 14 comprises a low concentration gradient of tin dioxide, which advantageously results in a de minimis refractive index change, resistance to hydrogen incursion, and thermal stability of any fiber Bragg gratings written into the interface region 14.

22 Claims, 10 Drawing Sheets

OTHER PUBLICATIONS

Childers et al. "Downhole Fiber Optic Real-Time Casing Monitor," in Industrial and Commercial Applications of Smart Structures Technologies 2007, Proc. of SPIE, vol. 6527, 65270J, 2007.

Brambilla, G. et al.: "High temperature point sensor using tin doped silica fiber gratings" Conference on Lasers and Electro-Optics. (CLEO 2001). Technical Digest. Postconference edition. Baltimore, MD, May 6-11, 2001; [Trends in Optics and Photonics. (TOPS)], US, Washington, WA: OSA, US vol. 56, May 6, 2001, pp. 117-118, XP010559626 ISBN: 978-1-55752-662-5.

International Search Report and Written Opinion issued in connection with international application No. PCT/US2008/063708 on Aug. 27, 2008.

* cited by examiner

OPTICAL FIBER WITH TIN DOPED CORE-CLADDING INTERFACE

FIELD OF THE INVENTION

The invention relates generally to optical fiber technologies. In particular, the invention relates to tin-doped optical fibers that resist attenuation losses at high temperatures.

BACKGROUND OF THE INVENTION

Available electronic sensors measure a variety of values, such as, pH, color, temperature, or pressure, to name a few. For systems that require a string of electronic sensors over a long distance, e.g., twenty to thirty kilometers or longer, powering the electronic sensors becomes difficult. Conventionally, the powering of electronic sensors requires running electrical wire from a power source to each of the electronic sensors. Powering electronic sensors electrically has been unreliable in the petroleum and gas industry. For example, electric wires spanning long distances are subject to a significant amount of interference and noise, thereby reducing the accuracy of the electronic sensors.

Optical fibers have become the communication medium of choice for long distance communication due to their excellent light transmission characteristics over long distances and the ease of fabrication of lengths of many kilometers. Further, the light being transmitted can interrogate the sensors, thus obviating the need for lengthy electrical wires. This is particularly important in the petroleum and gas industry, where strings of electronic sensors are used in wells to monitor downhole conditions.

As a result, in the petroleum and gas industry, passive fiber optic sensors are used to obtain various downhole measurements, such as pressure or temperature. A string of optical fibers within a fiber optic system is used to communicate information from wells being drilled, as well as from completed wells. The optical fiber could be deployed with a single point pressure-temperature fiber optic sensor. Also, a series of weakly reflecting fiber Bragg gratings (FBGs) may be written into a length of optical fiber or a single point Fabry-Perot sensor may be spliced into a length of optical fiber. An optical signal is transmitted down the fiber, which is reflected and/or scattered back to a receiver and analyzed to characterize external parameters along the length of the optical fiber. Using this information, downhole measurements including but not limited to temperature, pressure, and chemical environment may be obtained.

However, when conventional optical fibers such as germanium-doped silica fibers are exposed to the intense heat, pressure, and hydrogen-rich environment of an oil well attenuation losses increase. This increase in the loss of optical strength of the signal is due, in part, to the diffusion of hydrogen into the glass structure. Hydrogen atoms bond to any open or weak bonds in the glass structure, such as to certain germanium atoms in the vicinity of germanium-oxygen deficient centers or to form SiOH and/or GeOH. For germanium doped fibers, the attenuation increases rapidly with increases in temperature. As temperatures in a typical oil or gas well generally range from slightly less than surface temperature near the surface to between about 90 to 250 degrees Centigrade (C), and possibly 350 degrees C., conventional germanium-doped optical fibers are generally not sufficiently stable for prolonged use at depth in a well. While coating germanium-doped silica fibers with carbon or similar molecularly dense materials is an effective way to reduce hydrogen diffusion into the glass at lower temperatures, such as below 120 degrees C., the effectiveness of the carbon coating diminishes rapidly as the temperature increases.

It is known that fiber cores having alternate glass structures can be more stable when exposed to the type of environment encountered in a well. For example, pure silica glass core fibers are particularly suitable for use in oil wells as the pure silica is resistant to hydrogen incursion at high temperatures. However, at lower temperatures, such as the temperature in the upper portion of a well, attenuation losses from molecular hydrogen can be relatively large.

Therefore, a need exists for optical fiber that is resistant to hydrogen incursion and the correlated induced attenuation losses over a wider range of temperatures.

SUMMARY OF THE INVENTION

The present is directed towards an optical fiber comprising a substantially pure silica core; a depressed-index cladding layer concentrically surrounding the substantially pure silica core; and an interface disposed between the substantially pure silica core and the depressed-index cladding layer, wherein the interface has a photosensitizing dopant comprising tin.

The present invention is also directed towards a method of making an optical fiber utilizing modified chemical vapor deposition comprising the steps of providing a glass perform tube; depositing a plurality of depressed-index cladding layers along the inner surface of the glass perform tube; depositing fewer layers of tin-doped silica on the exposed surface of the depressed-index cladding layers; depositing a relatively thick, single layer of pure silica on the exposed surface of the doped silica layers; and collapsing the tube to form a solid core perform.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE INVENTION

Figure 1:
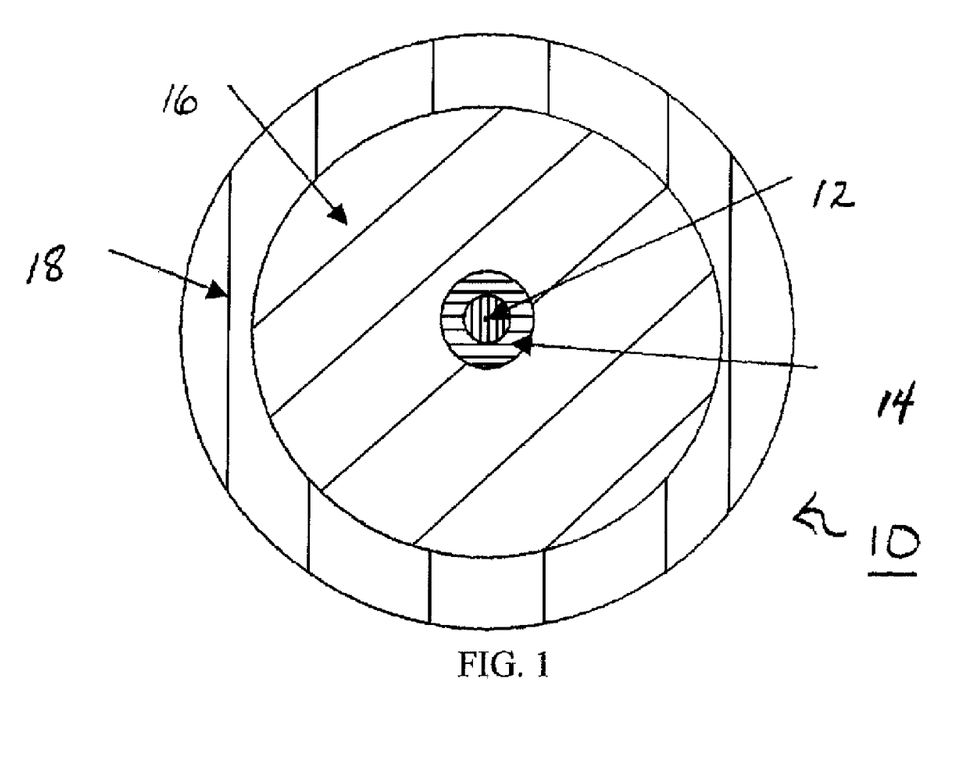
FIG. 1 is a schematic cross-sectional drawing of an optical fiber according to the present invention.

As illustrated in the accompanying drawings and discussed in detail below, the present invention is directed to an optical fiber. As shown in FIG. 1, optical fiber 10 generally includes a substantially pure silica glass core 12, a concentric tin-doped core/cladding interface region 14, a concentric fluorine-doped depressed cladding layer 16, and an optional outer cladding layer 18. The tin-doped core/cladding interface region 14 comprises a low concentration gradient of tin dioxide, which advantageously results in a de minimis refractive index change, resistance to hydrogen incursion, and thermal stability of any fiber Bragg gratings written into interface 14.

Optical fiber 10 employed in the present invention may include any suitable optical fiber including, but not limited to a single-mode or multi-mode optical fiber. Core 12 may be any substantially pure silica glass core known in the art. In one embodiment, core 12 may be a "defect free" pure silica core. The core/cladding interface 14 preferably forms a part of core 12, and sub-assembly 12, 14 may have a diameter of a conventional core. Alternatively, interface 14 can be a separate layer from core 12. Core 12 (and sub-assembly 12, 14) may have any diameter known in the art but preferably has a diameter of about 3-20 μm, more preferably about 8 μm, for operation in the 1000-1700 nm window.

Figure 2:
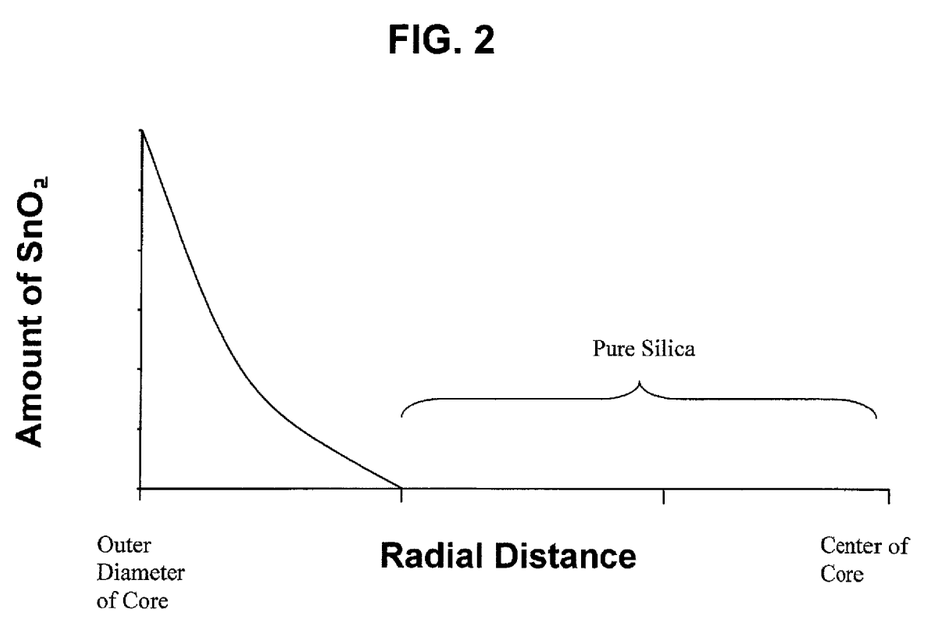
FIG. 2 is a schematic plot depicting the concentration of tin oxide versus radial distance from the center of an optical fiber core.

In accordance with one embodiment of the present invention, concentric tin-doped core/cladding interface region 14 preferably is a part of and comprises about 1% to 35% of the core region. More specifically, as depicted in FIG. 2, tin oxide doped-region 14 begins at a radial distance of about two-thirds from the center of pure silica core 12. The concentration of tin oxide gradually increases towards the outer diameter of core 12. Thus, the concentric tin-doped core/cladding interface region 14 comprises a gradient of tin oxide, which has been heretofore been unknown in the prior art. Alternatively, the tin oxide gradient can follow an opposite gradient or can be homogenous within interface 14.

As a result of the relatively thin $SnO_2$ gradient, the majority of the optical signal will be propagating within the pure silica core 12 and will not be significantly affected by hydrogen attenuation. Without being bound to any theory, in this design it is believed that dominant contribution to the overall hydrogen attenuation occurs as a consequence of hydrogen atoms bonding to any open or weak bonds in the glass structure such as tin atoms in the vicinity of tin-oxygen deficient centers. Thus, because tin atoms are confined only to the core/cladding interface 14, hydrogen attenuation is minimized within pure silica core 12. In tin doped fibers, this effect is further enhanced, over other dopants, because substantially less dopant levels are required for the photosensitivity necessary for grating fabrication. Further discussion of hydrogen attenuation can be found in commonly owned, co-pending U.S. Patent Appl. Pub. 2006/0222306, which is incorporated herein by reference in its entirety.

Figure 3:
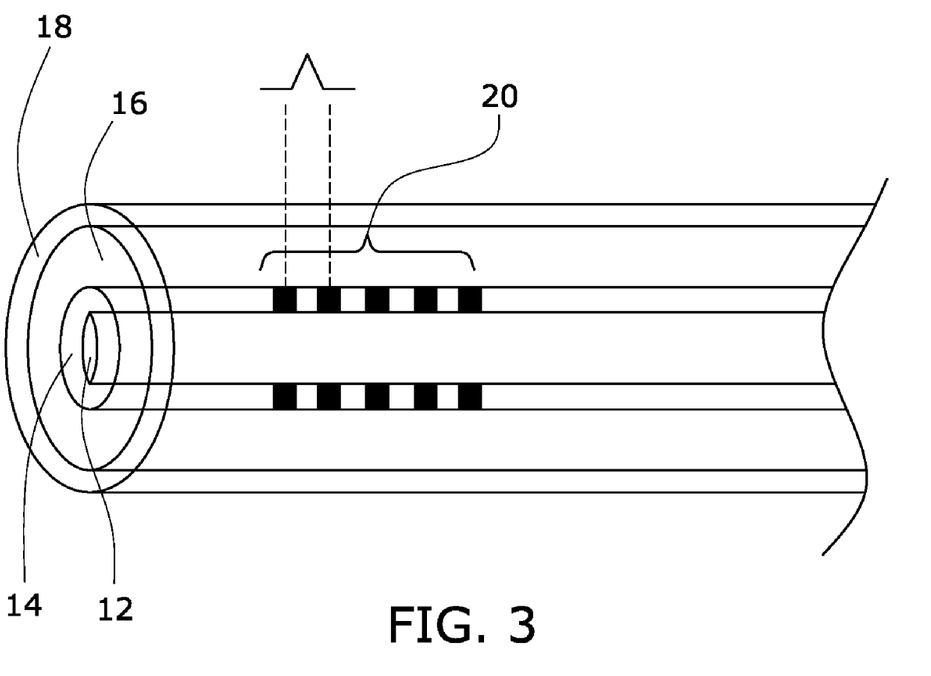
FIG. 3 is an isometric cross-sectional view of an optical fiber according to the present invention formed to include at least one Bragg grating along the tin-doped interface thereof.

In another advantageous aspect of the present invention, as depicted in FIG. 3, fiber Bragg gratings 20 are formed in the relatively thin Sn-doped interface region 14, where a sufficient energy of propagating optical signal is present to perform the monitoring function without interrupting the majority of the optical signal along core 12. As is well-known in the art, a fiber Bragg grating structure 20 may be formed along a predetermined length of a section of optical fiber by using a controlled UV exposure that functions to alter the refractive index of the fiber in a periodic fashion. In FIG. 3, fiber Bragg grating structure 20 has a grating period denoted by the symbol "Λ". However, one of ordinary skill in the art would understand that multiple Bragg gratings of differing periodicities may be written in the same fiber (either physically overlapping or sequentially formed along the fiber) to perform a number of different measurements.

In another advantageous aspect of the present invention, the tin-doped core/cladding interface region 14 is doped with less than 0.10 mol $SnO_2$, preferably with less than 0.07 mol $SnO_2$, and more preferably with less than 0.03 mol $SnO_2$. In a preferred embodiment of the present invention, the concentration of tin dopant is low so that the tin-doped core/cladding interface region 14 yields a de minimis refractive index change over pure silica (refractive index≈1.444 at 1550 nm). By comparison, when the concentration of tin dopant is 0.15 mol $SnO_2$, the tin-doped core/cladding interface region 14 yields a refractive index change of 0.006 over pure silica. These minor doping levels, elegantly dispersed at the core/cladding interface 14, are sufficient to produce weak fiber Bragg gratings 20 written into this region 14.

The relatively low concentration of tin dopant is a significant advance in the art of optical fibers because the resultant photosensitivity is comparable to fibers doped with germanium at concentration levels of 10-1000 times above the concentration of tin dopant used in the present invention. Moreover, previous efforts to fabricate tin doped fibers have utilized higher concentrations of $SnO_2$ or have utilized tin as a co-dopant with germanium or phosphorus. Because the present invention avoids the use germanium ions and uses only a minimal concentration (<0.10 mol) of tin ions, the resultant optical fiber exhibits behavior comparable to pure silica (i.e., it is resistant to hydrogen incursion) while also exhibiting improved thermal stability of the fiber Bragg gratings 20.

Figure 4:
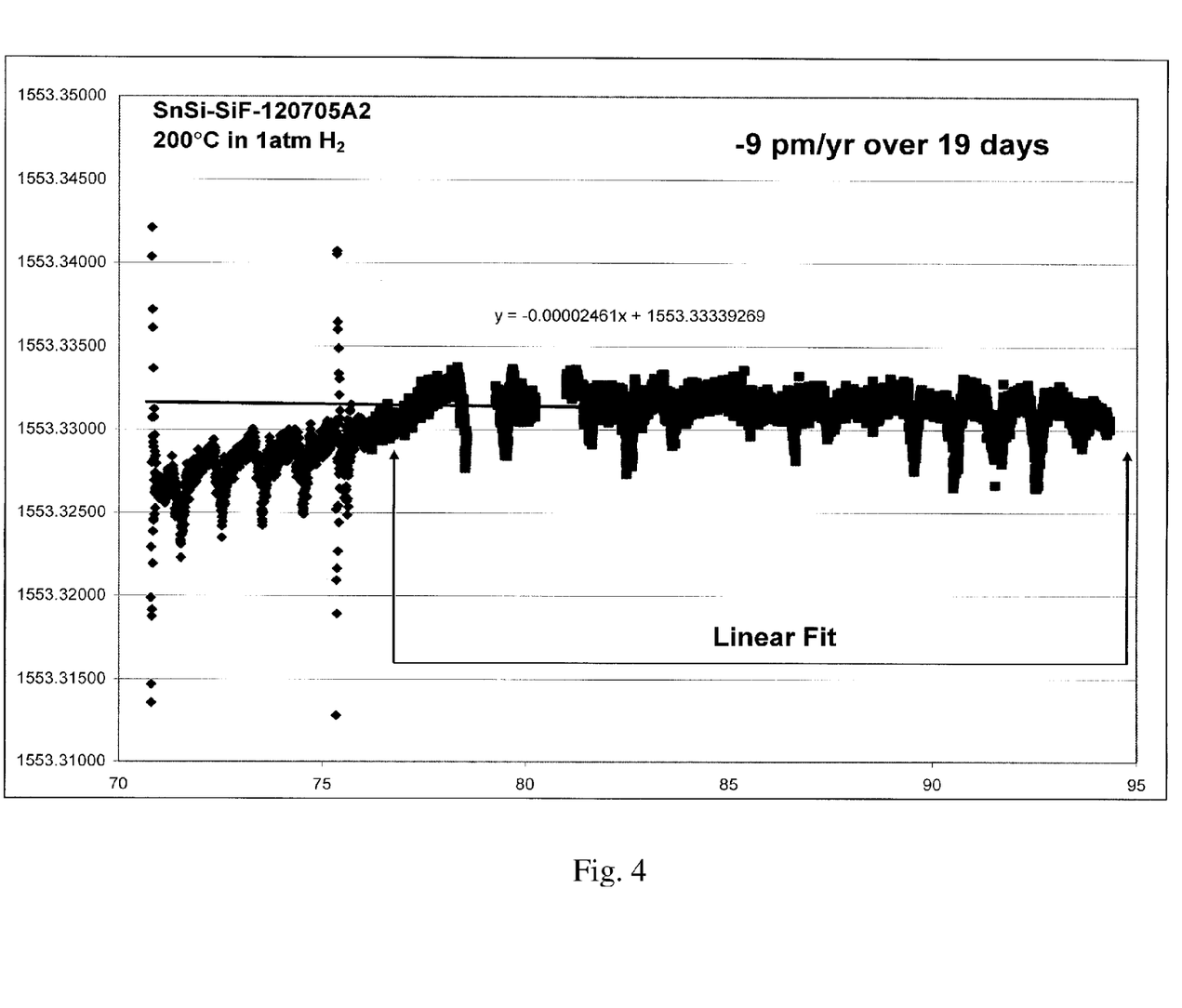
FIG. 4 illustrates a plot of Bragg grating wavelength drift in 1 atm of hydrogen at 200° C. for an inventive tin-doped optical fiber.
Figure 5:
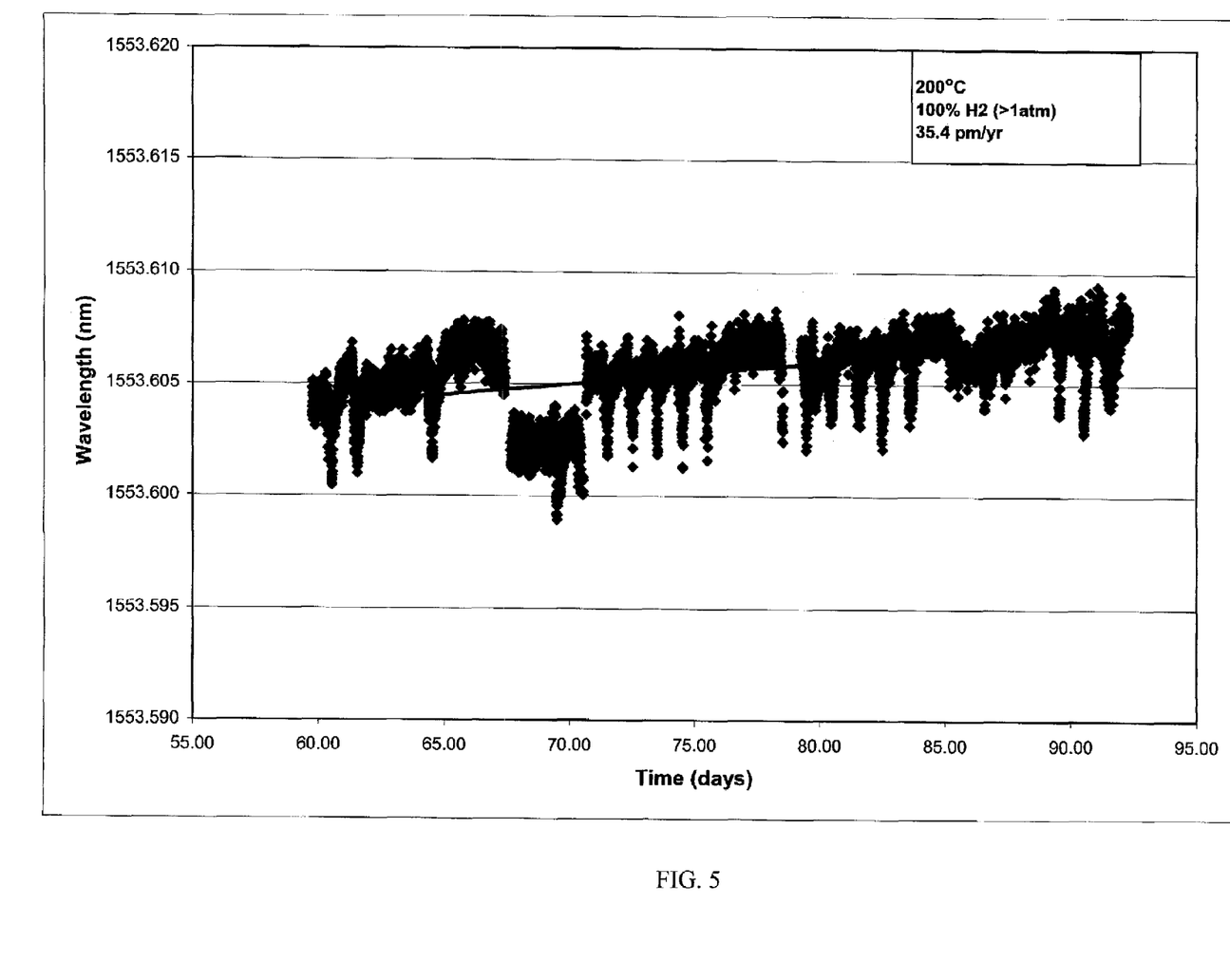
FIG. 5 illustrates a plot of Bragg grating wavelength drift in 1 atm of hydrogen at 200° C. for a standard germanium-doped fiber.

FIG. 4 illustrates that inventive optical fiber 10 resists hydrogen incursion. More specifically, FIG. 4 illustrates a plot of Bragg wavelength drift in 1 atm of hydrogen at 200° C. Typically, when gases such as hydrogen diffuse into an optical fiber, there is a resultant change in the refractive index proportional to the hydrogen concentration, and more importantly, permanent reactions at elevated temperatures with hydrogen that cause a drift in the Bragg wavelength. Because shifts in the Bragg wavelength are used to measure changes in values such as temperature and strain, it is important to minimize Bragg wavelength drift. Referring back to FIG. 4, it is shown that at a temperature of 200° C., the Bragg wavelength drifts at a rate of only −9 pm/year in the inventive tin-doped optical fiber 10. By contrast, FIG. 5 illustrates that in 1 atm of hydrogen at a temperature of 200° C., the Bragg wavelength drifts at a rate of 35 pm/year in a standard germanium-doped fiber. As used herein, the term "standard germanium doped-fiber" is a reference to a comparative optical fiber comprising a germanium-doped core/cladding interface region as disclosed in commonly held, co-pending application Ser. No. 11/807,151,entitled "Hydrogen-Resistant Optical Fiber/Grating Structure Suitable for Use in Downhole Sensor Applications," filed on even date herewith, which is incorporated herein by reference in its entirety. Thus, the data in FIGS. 4 and 5 demonstrate that the present invention advantageously minimizes hydrogen attenuation and associated Bragg wavelength drift. Moreover, knowing that the Bragg grating wavelength shifts 12 pm per 1° C., an optical fiber 10 according to the present invention provides an improvement of 3.7° C./yr in temperature drift.

Figure 6:
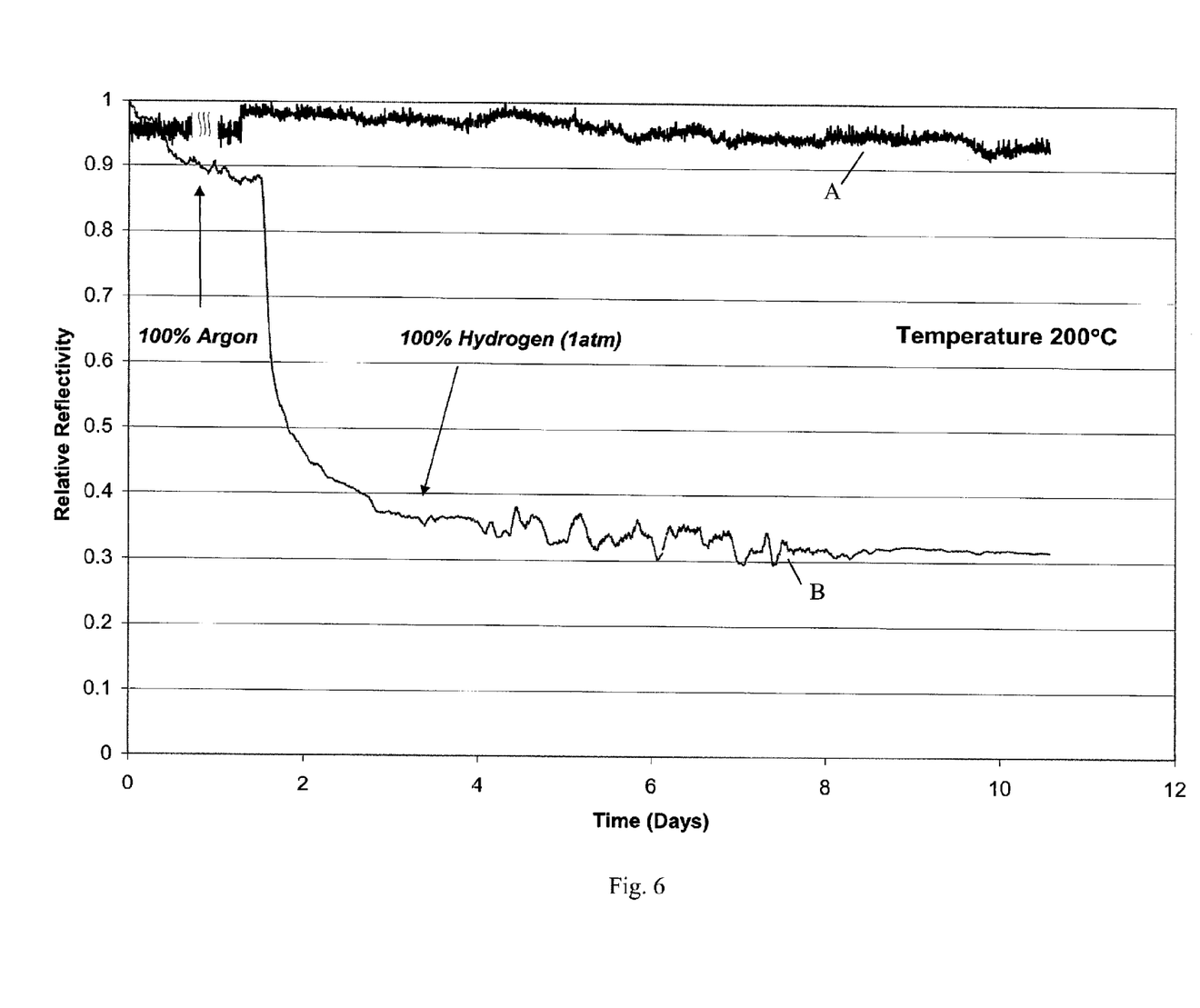
FIG. 6 illustrates the relative reflectivity of gratings written in an inventive tin-doped fiber versus a standard-germanium doped fiber.

FIG. 6 plots data, generated using Luna® Optical Backscatter Reflectometer, that illustrates that inventive tin-doped optical fiber 10 exhibits improved thermal stability of fiber Bragg gratings 20 (as shown in curve A) versus a standard germanium-doped optical fiber (as shown in curve B). More specifically, the thousands of fiber Bragg gratings 20 written in inventive tin-doped fiber 10 demonstrate minimal erasure, over a period of about ten days at 200° C. in 1 atm of argon and hydrogen, versus gratings written in standard germanium-doped fibers. Curve A shows that the decrease in the grating amplitude of the tin-doped fiber, as indicated by change in relative reflectivity measured at 1550 nm, is about 2-4% in argon and about 3-5% in hydrogen. Thus, the data suggest that there is minimal thermal decay of the fiber Bragg gratings 20 written in the inventive tin-doped fiber 10. By contrast, curve B shows that the decrease in the grating amplitude of the standard germanium-doped fiber, as indicated by change in relative reflectivity measured at 1550 nm, is about 10% in argon and about 50% in hydrogen. Thus, the data suggest that, unlike the present invention, fiber Bragg gratings written in standard germanium-doped fibers undergo more thermal decay.

Figure 7:
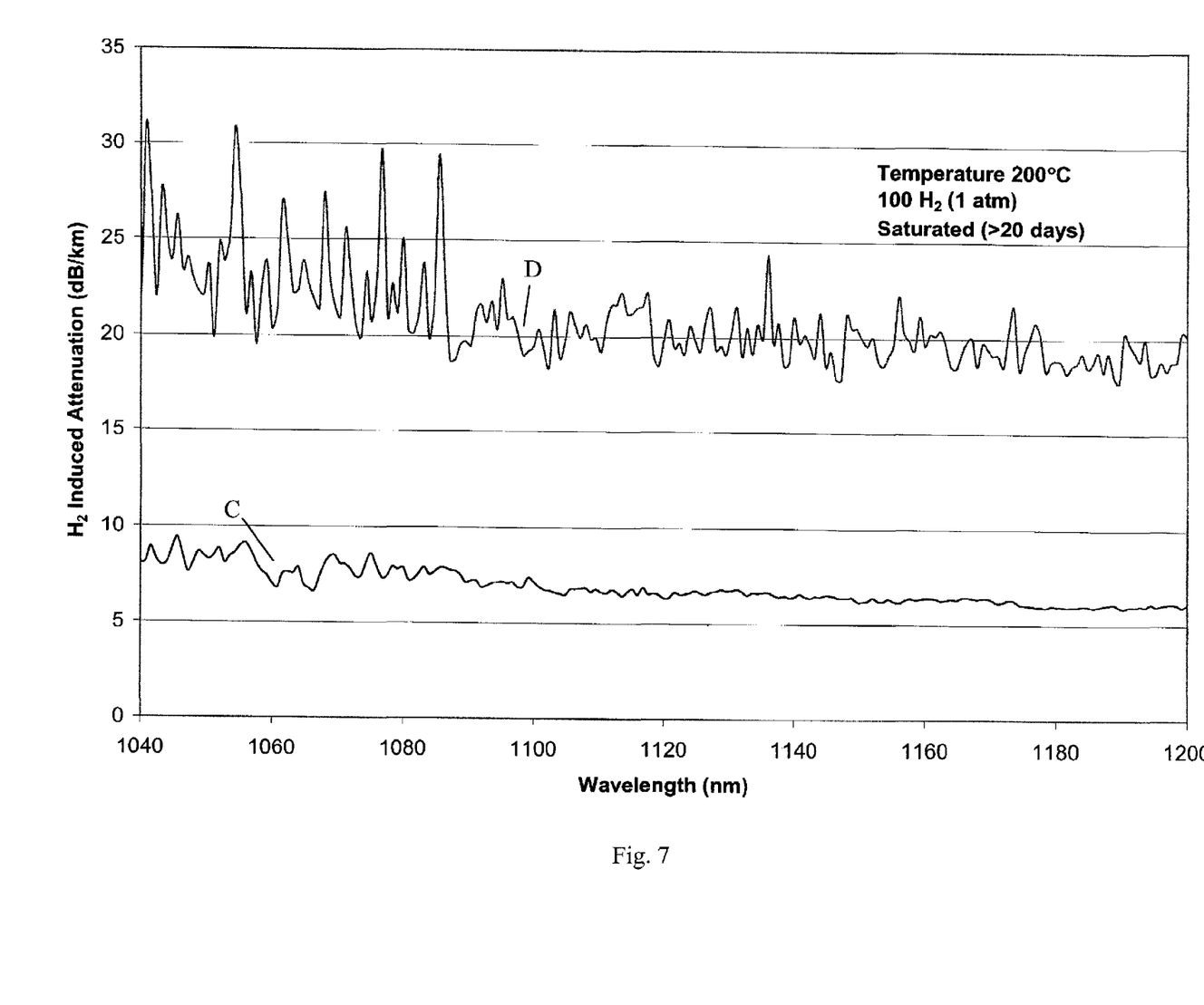
FIG. 7 illustrates the hydrogen-induced attenuation for an inventive tin-doped fiber versus a standard germanium-doped fiber.

FIG. 7 further illustrates that hydrogen-induced attenuation, as measured in the lower wavelength region 1040-1200 nm, is substantially reduced for the inventive tin-doped optical fiber 10 (as shown by curve C) versus the standard germanium-doped fiber (as shown by curve D) in 1 atm of hydrogen at a temperature of 200° C. Thus, unlike a typical prior art optical fiber that is susceptible to hydrogen-induced attenuation in the lower wavelength region 1040-1200 nm, the present invention demonstrates minimal hydrogen-induced attenuation indicating minimal reaction between the glass structure and hydrogen at an elevated temperature.

In addition to pure silica core 12 and interface region 14, optical fiber 10 also comprises a cladding layer 16, which may be any cladding layer known in the art appropriate for use with pure silica cores. In order to keep light signals contained within core 12, the index of refraction of cladding layer 16 is significantly different from that of core 12 due to differences in the material composition of the glass in the different parts of fiber 10. For example, to depress the index of refraction in cladding layer 16, the silica glass is doped with fluorine. Alternatively, boron or similar materials may be used as index-lowering dopants. Cladding layer 16 may be any thickness known in the art, preferably ranging from about a few microns to about one thousand microns. Optionally, an outer cladding layer 18 is concentrically disposed around cladding layer 16.

Optical fiber 10 is manufactured by any method known in the art, such as a system that draws fiber 10 from a silica glass preform. The preform may be made by any method known in the art, such as outside vapor-phase deposition, plasma-activated chemical-vapor deposition, or vapor-phase axial deposition. The preferred method for making the preform follows the basic technique of modified chemical-vapor deposition (MCVD), which is described in commonly held, co-pending application Ser. No. 11/807,151, entitled "Hydrogen-Resistant Optical Fiber/Grating Structure Suitable for Use in Downhole Sensor Applications," filed on even date herewith, which was previously incorporated by reference in its entirety, and U.S. Patent Application Publication No. 2006/0222306.

In one aspect of the present invention, the silica glass preform has the same relative dimensions as the drawn optical fiber 10 (e.g., the ratio of the core diameter to the outer diameter) even if the absolute dimensions were different. For example, if the preform has a core with a 1 mm diameter and an outer diameter of 10 mm, then the drawn optical fiber can have a core with a 12.5 μm diameter and an outer diameter of 125 μm. Even if the absolute dimensions of the preform were to change (e.g., core=2 mm and outer diameter=20 mm), the relative dimensions (i.e., the core diameter:outer diameter ratio=1:10) of both the preform and drawn optical fiber 10 would remain the same.

Figure 8:
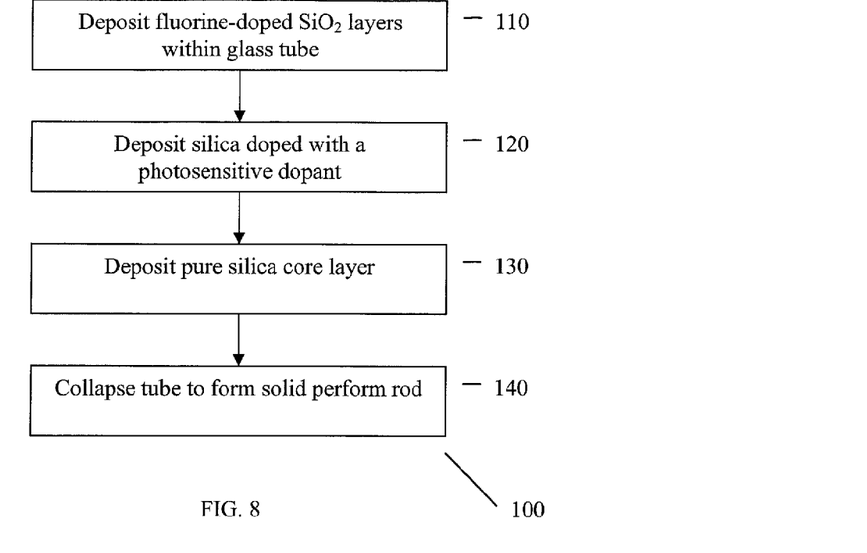
FIG. 8 is a flowchart of a method for forming an optical fiber according to the present invention.

FIG. 8 contains a flowchart of an MCVD method 100 that may be used to form a hydrogen-resistant fiber 10 according to the present invention. The process begins at step 110 wherein a plurality of separate gases are flowed through a glass tube so as to form multiple fluorine-doped $SiO_2$ layers. In one exemplary embodiment, sixty separate F-doped layers are deposited on the inner wall of the glass tube. The glass tube eventually forms outer cladding layer 18 of fiber 10, and the fluorine-doped $SiO_2$ layers eventually become cladding layer 16. As will be recognized by those in the art, if an alternate method of manufacturing is used where no glass tube is required, such as outside vapor-phase deposition or vapor-phase axial deposition, then optional outer cladding layer 18 may be eliminated.

The MCVD process then continues at step 120 by depositing tin-doped layers on the exposed surface of the F-doped material within the glass tube. The tin-doped layers eventually form Sn-doped interface region 14. In order to maintain this region 14 as relatively thin, only a few tin-doped layers are deposited. In one exemplary embodiment, three layers are deposited. One of ordinary skill in the art would appreciate that in addition to the MCVD passes described in steps 110 and 120, dopants may also be incorporated using other methods such as solution doping or sol-gel passes.

Following the deposition of the Sn-doped interface region 14, core 12 is formed by depositing a single layer of silica, in step 130, on the exposed surface of the Sn-doped interface region 14. In accordance with the present invention, the pure silica core layer is deposited to comprise a thickness significantly greater than the Sn-doped layers.

The final step in the formation of an optical fiber "preform" using an MCVD process, shown as step 140 in FIG. 8, is to collapse the tube (using a heat process, for example) to form a solid core preform from which an optical fiber may then be drawn down in conventional fashion.

Figure 9:
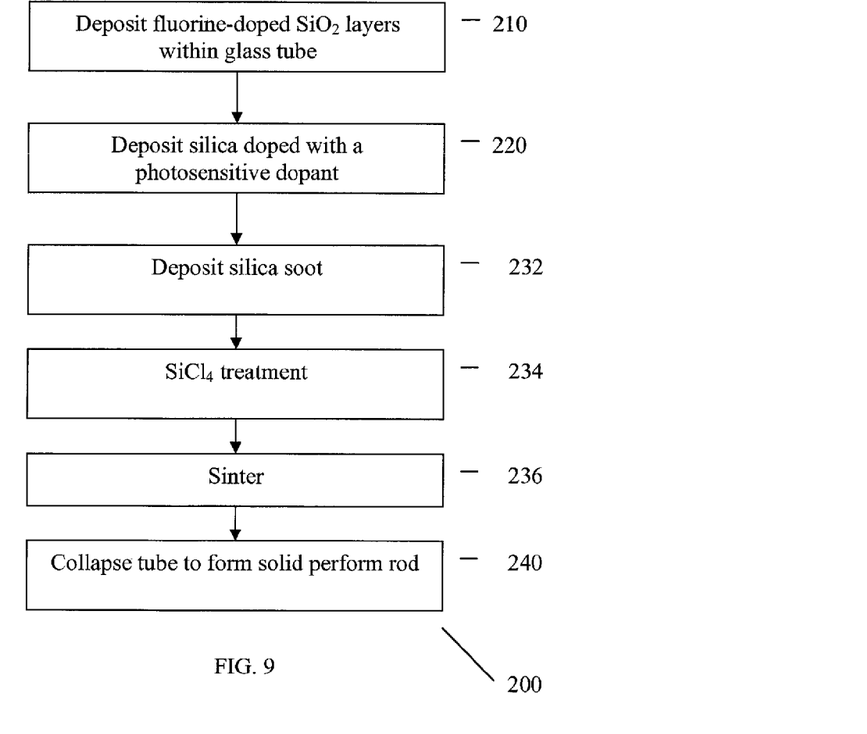
FIG. 9 is a flowchart of an alternative method for forming an optical fiber according to the present invention.

FIG. 9 contains a flowchart of an alternative MCVD method 200 that may be used to form inventive fiber 10 according to the present invention. Steps 210, 220, and 240 respectively correspond to steps 110, 120, and 140 of method 100 of FIG. 8, discussed above. However, the deposition of the pure silica core material is replaced by a three-step process including: (1) depositing silica soot in step 232, (2) "soaking" the soot in a gaseous or liquefied solution of $SiCl_4$, which is formed for example by bubbling $N_2$ through $SiCl_4$ and sending it to the lathe, in step 234, and (3) sintering the saturated soot to form the pure silica material in step 236. In one aspect of the present invention, before steps 232-236 are carried out, oxygen is substantially evacuated to create a reduced atmosphere with minimal or no oxygen present.

Figure 10:
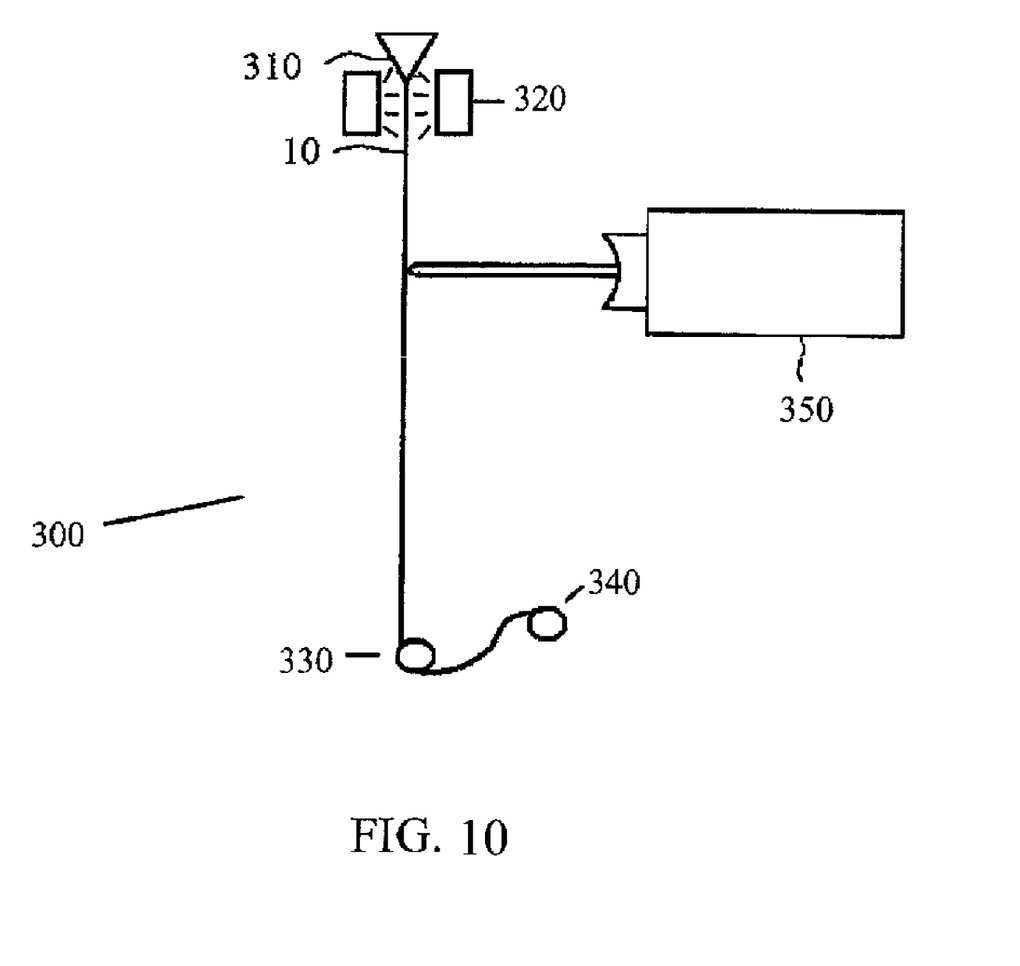
FIG. 10 illustrates a method for forming fiber Bragg gratings according to the present invention.
Figure 11:
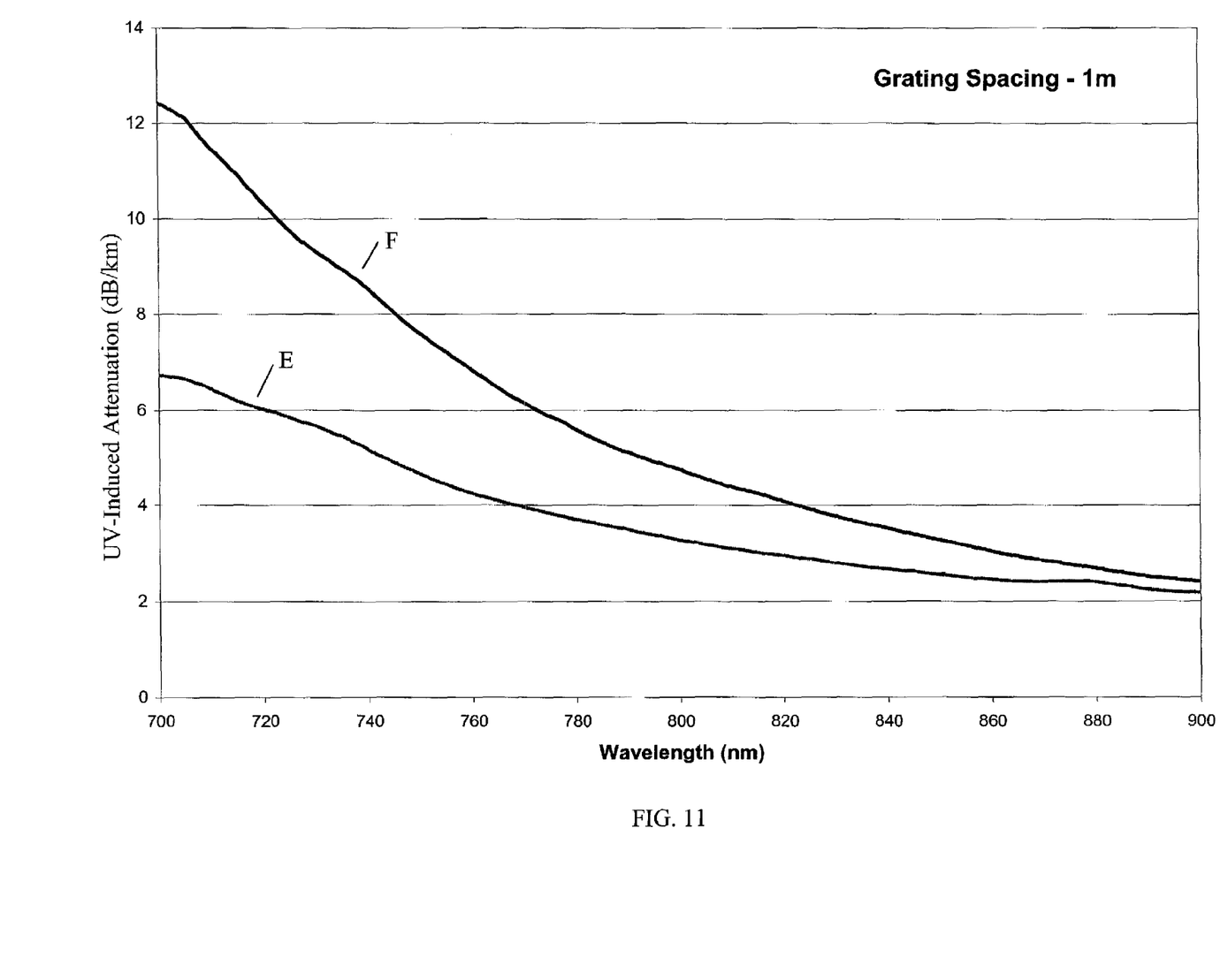
FIG. 11 illustrates the improved reduction in UV-induced attenuation for an inventive tin-doped fiber versus a standard germanium-doped fiber.

In one exemplary process, Bragg grating structures 20 may be formed within Sn-doped interface region 14 as the optical fiber 10 is being drawn down from the solid core preform. FIG. 10 illustrates, in a simplified view, an exemplary draw tower 300, where a solid core preform 310 is first passed through a high temperature furnace 320 to "melt" the preform and allow a glass fiber to be drawn. The drawn fiber then follows a downward path to a capstan 330 and take-up spool 340, where the tension/pull associated with capstan 330 and take-up spool 340 (as well as their speed) controls the drawing process. In accordance with the present invention, a UV source 350 is disposed at a predetermined position along the downward path of the drawing fiber to allow for the desired grating pattern to be "written" in Sn-doped interface region 14 as the fiber passes through source 350. Advantageously, the UV radiation will pass unimpeded through F-doped depressed cladding 16, allowing for the grating to form only in Sn-doped region 14. Moreover, in an advantageous aspect of the present invention, the UV induced loss incurred during exposure to the UV light during grating fabrication is significantly reduced over standard germanium-doped fibers with similar reflectivity as illustrated in FIG. 11. More specifically, FIG. 11 illustrates lower UV-induced attenuation values for the inventive tin-doped fiber 10 (as shown in curve E) versus a standard germanium-doped fiber (as shown in curve F) over the 700-900 nm wavelength range for 1 m spaced gratings.

Further descriptions of how Bragg gratings can be written in line onto an optical fiber can be found in commonly held, co-pending U.S. Patent Application Publication No. 2006/0140529, which is incorporated herein by reference in its entirety, and U.S. Patent Application Publication 2006/0222306, as well as U.S. Pat. Nos. 5,367,588, 5,327,515, and 5,351,321, and 5,400,422, which are also incorporated herein by reference in their entireties.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

What is claimed is:

1. An optical fiber comprising:
   a core comprising a first substantially pure silica core region and a second interface region surrounding the first substantially pure silica core region; and
   a depressed-index cladding layer concentrically surrounding the core
   wherein the second interface region has a photosensitizing dopant comprising tin, and wherein at least one fiber Bragg grating is formed within the second interface region.

2. The optical fiber in claim 1 wherein the optical fiber is either a single-mode optical fiber or a multi-mode optical fiber.

3. The optical fiber of claim 1 wherein the diameter of the core is in the range of about 3-20 μm.

4. The optical fiber of claim 1 wherein the thickness of the second interface region is less than the diameter of the first substantially pure silica core region.

5. The optical fiber of claim 1 wherein the photosensitizing dopant raises a refractive index $n_1$ of the second interface region to a value less than about 0.006 relative to a refractive index $n_2$ of pure silica.

6. The optical fiber of claim 1 wherein the interface comprises about 1% to 35% of the core.

7. The optical fiber of claim 6 wherein the interface begins at a radial distance of about two-thirds from the center of the core.

8. The optical fiber of claim 7 wherein the concentration of photosensitizing dopant gradually increases towards the outer diameter of the core.

9. The optical fiber of claim 7 wherein the concentration of photosensitizing dopant gradually decreases towards the outer diameter of the core.

10. The optical fiber of claim 7 wherein the concentration of photosensitizing dopant is homogenous.

11. The optical fiber of claim 1 wherein the depressed-index cladding layer is doped with fluorine or boron.

12. The optical fiber of claim 1 further comprising an outer cladding layer.

13. An optical fiber comprising:
    a substantially pure silica core;
    a depressed-index cladding layer concentrically surrounding the substantially pure silica core; and
    an interface layer disposed between the substantially pure silica core and the depressed-index cladding layer, wherein the interface layer has a photosensitizing dopant comprising tin, and wherein the concentration of photosensitizing dopant varies within the interface layer.

14. The optical fiber of claim 13 wherein the optical fiber is either a single-mode optical fiber or a multi-mode optical fiber.

15. The optical fiber of claim 13 wherein the diameter of the substantially pure silica core is in the range of about 3-20 μnm.

16. The optical fiber of claim 13 wherein the thickness of the interface layer is less than the diameter of the substantially pure silica core.

17. The optical fiber of claim 13 wherein at least one fiber Bragg grating is formed within the interface layer.

18. The optical fiber of claim 13 wherein the photosensitizing raises a refractive index $n_1$ of the second interface region to a value less than 0.006 relative to a refractive index $n_2$ of pure silica.

19. The optical fiber of claim 13 wherein the concentration of photosensitizing dopant gradually increases towards the outer diameter of the interface layer.

20. The optical fiber of claim 13 wherein the concentration of photosensitizing dopant gradually decreases towards the outer diameter of the interface layer.

21. An optical fiber comprising:
    a core comprising a first substantially pure silica core region and a second interface region surrounding the first substantially pure silica core region; and
    a depressed-index cladding layer concentrically surrounding the core,
    wherein the second interface region has a photosensitizing dopant comprising tin, and
    wherein the photosensitizing dopant raises a refractive index $n_1$ of the second interface region to a value less than about 0.006 relative to a refractive index $n_2$ of pure silica.

22. The optical fiber of claim 21 wherein at least one fiber Bragg grating is formed within the second interface region.

* * * * *